Patented May 15, 1945

2,376,186

UNITED STATES PATENT OFFICE 2,376,186

METHOD OF PREPARATION OF CYSTEINE AND GLUTATHIONE

Louis Rapkine, New York, N. Y.

No Drawing. Application March 21, 1942,
Serial No. 435,634

4 Claims. (Cl. 260—534)

The present invention relates to the preparation of cysteine and of the related compound glutathione containing cysteine and comprises a new method by which increased yields of cysteine and the reduced form of glutathione may be obtained from known sources with less cost and with a saving of time and chemicals. In the case of cysteine the new method makes the pure product available in the pure form as distinguished from the hydrochloride of cysteine produced by methods heretofore in use.

A feature of the invention is the use of cuprous oxide under controlled conditions of temperature and in the presence of a trace of chloride or hydrochloric acid for converting cystine to cysteine and oxidized glutathione to reduced glutathione, that is for breaking the bond between the two sulfur atoms of the oxidized products.

Another feature of the invention is the use of iodoacetic acid under controlled conditions of temperature and of hydrogen ion concentration for determining the amount of cuprous oxide to be added to a mother solution containing cysteine or reduced glutathione for precipitation of the cuprous salt of these products.

The prevalence of glutathione, and cysteine as a constituent thereof, in cell tissue makes these products important in the investigation or research of biochemical and physiological processes. Many fields of possible use of these products have been suggested but the present high cost of their extraction has heretofore discouraged the opening up of such fields of use. The process of the invention, however, by reduction in cost and simplification of procedure makes it possible for the production of these products to be put on a more practicable commercial basis, thus encouraging further investigation of their properties.

Cysteine is an amino-acid and has the formula

while cystine, the oxidized or non-reduced form of cysteine, has the formula

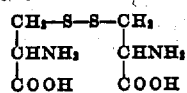

Glutathione is a tripeptide constituted of the three amino-acids; glycine, glutamic acid and cysteine. Its formula is:

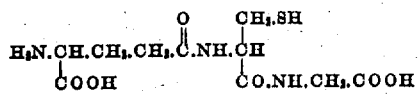

Like cystine, the non-reduced or oxidized form of glutathione comprises two molecules of the reduced form linked together by a bond between the S atoms, and it is the SH group of the cysteine constituent of glutathione which provides the bond. Thus the same problem is involved in reducing cystine to cysteine and in changing the oxidized glutathione, usually indicated as GS—SG, to the reduced form indicated as GSH, as in each case it involves the breaking of the bond between the S atoms of the oxidized forms of these compounds. I have found that this bond may be effectively broken and the reduced substances obtained by the use of cuprous oxide provided certain conditions are maintained. The cuprous oxide, when the conditions are met, splits each molecule of cystine into two molecules of cuprous cysteine from which cysteine is readily obtained by treatment with hydrogen sulphide. Similarly the cuprous oxide splits each molecule of oxidized glutathione at the bond between the cysteine constituents into two molecules of the cuprous salt of glutathione from which reduced glutathione is recovered by treatment with hydrogen sulphide.

The optimum conditions at which the above described reduction by cuprous oxide occur are: at temperatures from 80° to 95° C., in a medium between 0.3 to 0.5N acid and in the presence of a trace of chloride or hydrogen chloride.

The application to a complete process for obtaining cysteine of the above described ability of cuprous oxide to cut the bond between the two sulfur atoms of cystine will be understood from the following specific example.

A source of cystine is human hair or wool. Human hair preferably is used and is first washed in cold dilute sodium carbonate solution and dried to remove the natural oils from the hair. 2 kilograms of the dried washed hair is placed in a six-liter Pyrex flask and four liters of constant boiling (20%) hydrochloric acid is added. The hair is hydrolyzed by boiling the contents of the flask over a free flame or on a sand-bath or by heating on a steam-bath until the biuret reaction is entirely negative. This brings the amino acids including cystine and tyrosine as well as other substances, such as "humin" and melanin, into solution. At this point, the heretofore described treatment with cuprous oxide is employed to precipitate cuprous cysteine. Cuprous oxide is added after the acidity is brought to from 0.3 to 0.5N and the temperature is raised to between 80 and 95 degrees centigrade. Cuprous cysteine then precipitates. After filtration, the precipitate, cuprous cysteine, is treated with hydrogen sulphide gas, the cuprous sulphide then formed is filtered off and the remaining liquor, concentrated in vacuo until pure cysteine crystallizes.

The advantage of the above described procedure as compared with the process now generally in use will be apparent from the following. Heretofore, after hydrolysis of the hair as above described and the obtaining of the amino acids in solution, it was necessary to almost neutralize the solution with a concentrated sodium hydroxide solution followed by a treatment with sodium acetate solution until the Congo red test for mineral acids became negative. Then a wait of from 48 to 72 hours was required for precipitation of cystine. However, the cystine so precipitated was mixed with "humin," melanin and tyrosine which had to be removed by dissolving in 3% hydrochloric acid and by complete decolorization, as for example with good bone black. Often a second decolorization needs be practiced; then again neutralization, washing with hot water and recrystallization. In other words repeated crystallization had to be effected. The cystine thus obtained was then reduced by dissolving in hydrochloric acid in the presence of zinc dust, the resulting product being cysteine hydrochloride.

Thus, the new method as compared to those heretofore in use decidedly simplifies and shortens the procedure by eliminating various steps which required great care, such as the neutralization step in which care had to be taken not to make the solution alkaline and the prolonged decolorizing step. The process results in pure cysteine as compared with cysteine hydrochloride obtained by the earlier method.

The invention as applied to the preparation of glutathione can best be understood if reference is first made to the standard process now in use. This process involves four steps which may be briefly described as follows:

1. A mixture of sulphuric acid, alcohol and ether is poured onto pressed baker's yeast and stirred until homogeneous. The mixture is then filtered and acidified with 20% sulphuric acid until 0.5 normal.

2. Cuprous salt of G—SH is precipitated by addition of cuprous oxide suspended in water to the filtrate obtained by the first step; the temperature being maintained at about 40° C.

3. The precipitated cuprous salt of G—SH is washed on a centrifuge with oxygen free water until free from sulphate.

4. The precipitate is decomposed with hydrogen sulphide, filtered, and the water clear solution containing G—SH concentrated in vacuo and crystallized.

In the second step of the above described process, only the reduced glutathione is precipitated as the cuprous salt. In all extracts of yeast, both forms of glutathione are present and during the various steps of preparation much of the G—SH is oxidized into G—S—S—G because of the large surfaces to which the material is exposed and because of traces of iron and copper (catalysts for oxidation of G—SH) which are always more or less present in biological extracts. Thus, in the process as heretofore practiced, only the reduced form of glutathione has been recovered; that part of the glutathione which existed in the yeast as G—S—S—G, or which became oxidized to that form during the treatment, being lost. By the present invention, however, an additional step is added to the former process by which this heretofore lost part of the glutathione is recovered. This new step is as follows:

After the cuprous salt of glutathione has been precipitated and separated by step (2) the acidity of the mother liquor is brought to between 0.3 and 0.5N, a trace of chloride is added and the liquor heated to a temperature between 80 and 95° C. Cuprous oxide is then added which, as heretofore described, causes the bond between the sulfur atoms of GS—SG to be split and the cuprous salt of reduced glutathione to be precipitated. The precipitate is then added to the precipitate from step (2) and the reduced glutathione obtained therefrom as in steps (3) and (4).

The invention includes another improvement on the process for preparing glutathione as heretofore described, namely one directed to the second step of the process. Great difficulty has heretofore been had in determining the correct amount of cuprous oxide to be added to the filtrate of the first step. If too great an amount is added, the cuprous salt of G—SH redissolves and is difficult to recover with consequent loss of product. To avoid this difficulty, the practice has been to add an insufficient amount of cuprous oxide, thus also reducing the yield. I have found that the exact amount of cuprous oxide for maximum yield may be readily determined by a prior titration to determine the amount of G—SH in the extract.

This titration is based on the fact that reduced glutathione reacts stoichiometrically, molecule for molecule, with iodoacetic acid according to the equation:

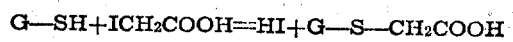

G—SH+ICH$_2$COOH=HI+G—S—CH$_2$COOH

This reaction takes place readily at a pH (hydrogen ion concentration) of from 6.5 to 7.5 and at a temperature within the range of 20 to 45° C. It is rapid at a pH close to 7.5 and at a temperature of 35° C. when the reacting substances are at a concentration of M/100. Now, substances containing the SH group give a characteristic color reaction with sodium nitroprusside. After reaction with iodoacetic acid and consequent blocking of the SH group as indicated by the foregoing equation, no color reaction with sodium nitroprusside occurs.

Accordingly, titration of the extract to determine the exact quantity of G—SH, and therefore of the amount of cuprous oxide to be added is done as follows:

Aliquot parts of the extract from step (1) are pipetted into test tubes (preferably test tubes that can be evacuated or into which a slow stream of nitrogen gas can be introduced). To these test tubes is added exact amounts of neutralized iodacetic acid in varyingly increasing amounts. Buffer solution is also added to each test tube in order to bring to correct pH and in order to avoid acidification which could slow up the speed of the reaction between the SH group and iodoacetic acid. The test tubes and their contents (with adequate controls) are incubated at 35° C. and at pH of 7.5. When the nitroprusside reaction characteristic for the SH groups disappears completely in one test tube, then the measured amount of iodoacetic acid added thereto is an exact measurement of the SH group in solution in that tube, and hence of the amount of reduced glutathione. From this titration the exact amount of cuprous oxide to be added in the second step of the process for complete precipitation of the reduced glutathione as a cuprous salt is readily computed.

Thus the invention as applied to the preparation of glutathione includes an improvement in step (2) of the process which increases the yield by insuring complete precipitation of the glutathione in solution in the reduced form and adds a further step which further increases the yield by recovering that part of the glutathione that was in solution in the oxidized form or became oxidized during the process.

The invention has now been described in connection with the preparation of cysteine and reduced glutathione. In its broadest aspects, however, the invention is not limited to these specific substances as the described method for reducing cystine to cysteine can be used for converting any product having the general formula R—S—S—R into the reduced form RSH and the described method of titration with iodoacetic acid could be used for measuring the amount of cuprous oxide to be added for complete precipitation from a solution of any product of the formula RSH. For example, this titration method using iodoacetic acid, although described hereinbefore only in connection with the preparation of reduced glutathione, could be employed in the preparation of cysteine. That is, after hydrolysis of hair to bring the amino acids into solution, the cystine could be immediately reduced to cysteine by the use of hydrochloric acid and zinc dust, then titration by the use of iodoacetic acid would determine the amount of cysteine hydrochloride in solution and, therefore, the correct amount of cuprous oxide to be added for precipitation of the cysteine and its consequent separation from the other ingredients of the liquor.

Thus this titration method using iodoacetic acid may be advantageously employed whenever it is desired to know the exact amount of a substance in solution, when such substance contains the SH group, that is when such substance has the general formula R—SH. Many such substances are known to chemists. Among them can be mentioned thiglycollic acid, thiolactic acid and certain forms of the thiosugars.

I claim:

1. The method of preparing a substance of the general formula RSH where R is a member of the group consisting of the radicals of cysteine and glutathione except the sulfhydril group SH from a solution containing the oxidized form R—S—S—R which comprises bringing the solution to an acidity of 0.3 to 0.5N, adding a trace of chloride and heating to a temperature of from 80° to 95° C., then adding cuprous oxide to precipitate the cuprous salt of the reduced substance, and thereafter removing the copper and crystallizing the reduced substance.

2. The method of preparing cysteine which comprises hydrolyzing hair to bring cystine into solution together with the other amino acids and other constituents of the hair, bringing the solution to an acidity of 0.3 to 0.5N, then adding a trace of chloride and heating to bring the temperature to from 80° to 95° C., adding cuprous oxide to precipitate cuprous cysteine and finally treating the cuprous cysteine to recover the cysteine in crystalline form.

3. The method of preparing reduced glutathione from a solution containing oxidized glutathione which comprises bringing the solution to an acidity of 0.3 to 0.5N, adding a trace of chloride and heating the solution to from 80° to 95° C., then adding cuprous oxide to precipitate the cuprous salt of reduced glutathione and finally treating the precipitate to separate the reduced glutathione therefrom.

4. The method of preparing G—SH from yeast where G represents all of the glutathione molecule except the sulfhydril group SH which comprises making a homogeneous mixture of yeast with sulphuric acid, alcohol and ether, filtering the mixture and acidifying to about 0.5N, bringing the temperature of the acidified solution to about 40° C. and adding cuprous oxide to precipitate the cuprous salt of GSH, separating the precipitated salt from the mother liquor, bringing the liquor to an acidity of from 0.3 to 0.5N, adding a trace of chloride thereto and heating to from 80 to 95° C., then adding cuprous oxide to the liquor to break the bond between the sulfur atoms of the G—S—S—G in solution and precipitate the cuprous salt of GSH, then combining the latter precipitate with the earlier separated precipitate and finally treating the combined precipitates to separate GSH therefrom.

LOUIS RAPKINE.

CERTIFICATE OF CORRECTION.

Patent No. 2,376,186. May 15, 1945.

LOUIS RAPKINE.

It is hereby certified that error appears in the printed specification of the above numbered patent requiring correction as follows: Page 2, second column, line 49, for "iodiacetic" read --iodoacetic--; and that the said Letters Patent should be read with this correction therein that the same may conform to the record of the case in the Patent Office.

Signed and sealed this 7th day of August, A. D. 1945.

Leslie Frazer (Seal) Acting Commissioner of Patents.

nection with the preparation of cysteine and reduced glutathione. In its broadest aspects, however, the invention is not limited to these specific substances as the described method for reducing cystine to cysteine can be used for converting any product having the general formula R—S—S—R into the reduced form RSH and the described method of titration with iodoacetic acid could be used for measuring the amount of cuprous oxide to be added for complete precipitation from a solution of any product of the formula RSH. For example, this titration method using iodoacetic acid, although described hereinbefore only in connection with the preparation of reduced glutathione, could be employed in the preparation of cysteine. That is, after hydrolysis of hair to bring the amino acids into solution, the cystine could be immediately reduced to cysteine by the use of hydrochloric acid and zinc dust, then titration by the use of iodoacetic acid would determine the amount of cysteine hydrochloride in solution and, therefore, the correct amount of cuprous oxide to be added for precipitation of the cysteine and its consequent separation from the other ingredients of the liquor.

Thus this titration method using iodoacetic acid may be advantageously employed whenever it is desired to know the exact amount of a substance in solution, when such substance contains the SH group, that is when such substance has the general formula R—SH. Many such substances are known to chemists. Among them can be mentioned thiglycollic acid, thiolactic acid and certain forms of the thiosugars.

I claim:

1. The method of preparing a substance of the general formula RSH where R is a member of the group consisting of the radicals of cysteine and glutathione except the sulfhydril group SH from a solution containing the oxidized form R—S—S—R which comprises bringing the solution to an acidity of 0.3 to 0.5N, adding a trace of chloride and heating to a temperature of from 80° to 95° C., then adding cuprous oxide to precipitate the cuprous salt of the reduced substance, and thereafter removing the copper and crystallizing the reduced substance.

2. The method of preparing cysteine which comprises hydrolyzing hair to bring cystine into solution together with the other amino acids and other constituents of the hair, bringing the solution to an acidity of 0.3 to 0.5N, then adding a trace of chloride and heating to bring the temperature to from 80° to 95° C., adding cuprous oxide to precipitate cuprous cysteine and finally treating the cuprous cysteine to recover the cysteine in crystalline form.

3. The method of preparing reduced glutathione from a solution containing oxidized glutathione which comprises bringing the solution to an acidity of 0.3 to 0.5N, adding a trace of chloride and heating the solution to from 80° to 95° C., then adding cuprous oxide to precipitate the cuprous salt of reduced glutathione and finally treating the precipitate to separate the reduced glutathione therefrom.

4. The method of preparing G—SH from yeast where G represents all of the glutathione molecule except the sulfhydril group SH which comprises making a homogeneous mixture of yeast with sulphuric acid, alcohol and ether, filtering the mixture and acidifying to about 0.5N, bringing the temperature of the acidified solution to about 40° C. and adding cuprous oxide to precipitate the cuprous salt of GSH, separating the precipitated salt from the mother liquor, bringing the liquor to an acidity of from 0.3 to 0.5N, adding a trace of chloride thereto and heating to from 80 to 95° C., then adding cuprous oxide to the liquor to break the bond between the sulfur atoms of the G—S—S—G in solution and precipitate the cuprous salt of GSH, then combining the latter precipitate with the earlier separated precipitate and finally treating the combined precipitates to separate GSH therefrom.

LOUIS RAPKINE.

CERTIFICATE OF CORRECTION.

Patent No. 2,376,186. May 15, 1945.

LOUIS RAPKINE.

It is hereby certified that error appears in the printed specification of the above numbered patent requiring correction as follows: Page 2, second column, line 49, for "iodiacetic" read --iodoacetic--; and that the said Letters Patent should be read with this correction therein that the same may conform to the record of the case in the Patent Office.

Signed and sealed this 7th day of August, A. D. 1945.

Leslie Frazer (Seal) Acting Commissioner of Patents.